(12) United States Patent
Lee et al.

(10) Patent No.: US 9,436,389 B2
(45) Date of Patent: *Sep. 6, 2016

(54) MANAGEMENT OF SHARED STORAGE I/O RESOURCES

(71) Applicant: Oracle International Corporation, Redwood Shores, CA (US)

(72) Inventors: Sue-Kyoung Lee, Foster City, CA (US); Margaret Susairaj, Sunnyvale, CA (US); Sumanta Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,436

(22) Filed: Oct. 31, 2014

(65) Prior Publication Data

US 2015/0058498 A1    Feb. 26, 2015

Related U.S. Application Data

(63) Continuation of application No. 11/716,364, filed on Mar. 8, 2007, now Pat. No. 8,892,780.

(51) Int. Cl.
*G06F 3/06* (2006.01)

(52) U.S. Cl.
CPC .............. *G06F 3/061* (2013.01); *G06F 3/067* (2013.01); *G06F 3/0659* (2013.01); *G06F 3/0683* (2013.01)

(58) Field of Classification Search
CPC ...... G06F 3/061; G06F 3/0659; G06F 3/067; G06F 3/0683

USPC ............................................................ 710/6
See application file for complete search history.

(56) References Cited

U.S. PATENT DOCUMENTS

| 5,487,164 A | 1/1996 | Krichhofer |
| 5,551,018 A | 8/1996 | Hansen |
| 6,044,367 A | 3/2000 | Wolff |

(Continued)

FOREIGN PATENT DOCUMENTS

| CN | 101150483 | 3/2008 |
| JP | 2002278704 A | 9/2002 |

(Continued)

OTHER PUBLICATIONS

Oracle Database Administrator's Guide, 10g Release 2 (10.2), Chapter 24, May 2006, p. 24-4.*

(Continued)

*Primary Examiner* — Henry Tsai
*Assistant Examiner* — John Roche
(74) *Attorney, Agent, or Firm* — Hickman Palermo Becker Bingham LLP

(57) ABSTRACT

Automated management of shared I/O resources involves use of a policy engine for implementing I/O scheduling group I/O policies. The I/O policies are used for determining whether corresponding I/O requests should be issued to a shared storage system immediately or should be delayed via corresponding policy-based queues. In the context of database systems, a database administrator can specify policies regarding how I/O resources should be used and the database system itself enforces the policies, rather than requiring the database administrator enforce the I/O usage of the database and of the individual users.

26 Claims, 5 Drawing Sheets

(56) References Cited

U.S. PATENT DOCUMENTS

| | | | |
|---|---|---|---|
| 6,247,077 B1* | 6/2001 | Muller et al. | 710/74 |
| 6,715,006 B1 | 3/2004 | Hotta et al. | |
| 6,886,084 B2 | 4/2005 | Kawashima et al. | |
| 6,928,451 B2 | 8/2005 | Mogi et al. | |
| 7,136,970 B2* | 11/2006 | Yoshiya et al. | 711/152 |
| 7,228,354 B2 | 6/2007 | Chambliss et al. | |
| 7,237,027 B1 | 6/2007 | Raccah et al. | |
| 7,420,987 B1 | 9/2008 | Basu et al. | |
| 7,454,420 B2 | 11/2008 | Ray et al. | |
| 7,689,623 B1 | 3/2010 | Liu | |
| 7,739,470 B1 | 6/2010 | Norgren | |
| 7,761,425 B1 | 7/2010 | Erickson et al. | |
| 7,895,216 B2 | 2/2011 | Longshaw et al. | |
| 7,904,562 B2 | 3/2011 | Taskase et al. | |
| 8,001,134 B2 | 8/2011 | Liu | |
| 8,204,892 B2 | 6/2012 | Balebail | |
| 2002/0143755 A1 | 10/2002 | Wynblatt et al. | |
| 2003/0046396 A1 | 3/2003 | Richter et al. | |
| 2003/0172059 A1 | 9/2003 | Andrei | |
| 2003/0217071 A1 | 11/2003 | Kobayashi | |
| 2004/0003087 A1 | 1/2004 | Chambliss et al. | |
| 2004/0024921 A1 | 2/2004 | Peake et al. | |
| 2004/0062106 A1 | 4/2004 | Ramesh et al. | |
| 2004/0193570 A1 | 9/2004 | Yaeger | |
| 2005/0050083 A1 | 3/2005 | Jin et al. | |
| 2005/0076154 A1* | 4/2005 | Chambliss et al. | 710/1 |
| 2005/0120025 A1 | 6/2005 | Rodriguez et al. | |
| 2006/0064405 A1 | 3/2006 | Jiang et al. | |
| 2006/0101086 A1 | 5/2006 | Ray et al. | |
| 2006/0120379 A1* | 6/2006 | Beshai | 370/395.4 |
| 2006/0224451 A1 | 10/2006 | Kerschbrock et al. | |
| 2007/0239680 A1 | 10/2007 | Oztekin et al. | |
| 2007/0271570 A1 | 11/2007 | Brown et al. | |
| 2008/0016074 A1 | 1/2008 | Ben-dyke et al. | |
| 2008/0104283 A1 | 5/2008 | Shin et al. | |
| 2008/0126645 A1* | 5/2008 | Yamaguchi et al. | 710/117 |
| 2008/0147599 A1 | 6/2008 | Young-Lai | |
| 2008/0177803 A1 | 7/2008 | Fineberg et al. | |
| 2008/0208861 A1 | 8/2008 | Ray et al. | |
| 2008/0222311 A1 | 9/2008 | Lee et al. | |
| 2008/0244209 A1 | 10/2008 | Seeclam et al. | |
| 2009/0024384 A1 | 1/2009 | Kobayashi et al. | |
| 2009/0034377 A1 | 2/2009 | English et al. | |
| 2009/0063591 A1 | 3/2009 | Betten et al. | |
| 2009/0119295 A1 | 5/2009 | Chou et al. | |
| 2010/0082648 A1 | 4/2010 | Potapov et al. | |
| 2010/0122026 A1 | 5/2010 | Umamagerswaran et al. | |
| 2010/0191717 A1 | 7/2010 | Graefe | |
| 2010/0191749 A1 | 7/2010 | Liu | |
| 2010/0211577 A1 | 8/2010 | Shimizu et al. | |
| 2011/0055232 A1 | 3/2011 | Graefe | |
| 2011/0066791 A1 | 3/2011 | Goyal et al. | |
| 2011/0099179 A1 | 4/2011 | Balebail | |
| 2011/0302178 A1 | 12/2011 | Liu | |
| 2012/0072776 A1 | 3/2012 | Ng et al. | |

FOREIGN PATENT DOCUMENTS

| | | |
|---|---|---|
| JP | 2003150419 | 5/2003 |
| JP | 2004038758 | 2/2004 |

OTHER PUBLICATIONS

U.S. Appl. No. 11/716,364, filed Mar. 8, 2007, Final Office Action, mailed Sep. 3, 2009.

U.S. Appl. No. 11/716,364, filed Mar. 8, 2007, Advisory Action, mailed Jun. 4, 2014.

U.S. Appl. No. 11/716,364, filed Mar. 8, 2007, Notice of Allowance, mailed Jul. 3, 2014.

U.S. Appl. No. 13/418,150, filed Mar. 12, 2012, Notice of Allowance, mailed Apr. 4, 2013.

U.S. Appl. No. 13/971,158, filed Aug. 20, 2013, Office Action, mailed Dec. 9, 2013.

U.S. Appl. No. 13/971,158, filed Aug. 20, 2013, Notice of Allowance, mailed Jun. 19, 2014.

U.S. Appl. No. 11/716,364, filed Mar. 8, 2007, Final Office Action, mailed Nov. 6, 2012.

U.S. Appl. No. 11/716,364, filed Mar. 8, 2007, Final Office Action, mailed Jun. 8, 2010.

U.S. Appl. No. 11/716,364, filed Mar. 8, 2007, Office Action, mailed Oct. 6, 2011.

U.S. Appl. No. 11/716,364, filed Mar. 8, 2007, Interview Summary, mailed Jan. 9, 2012.

U.S. Appl. No. 11/716,364, filed Mar. 8, 2007, Interview Summary, mailed Oct. 28, 2009.

U.S. Appl. No. 11/716,364, filed Mar. 8, 2007, Interview Summary, mailed Nov. 10, 2009.

U.S. Appl. No. 11/716,364, filed Mar. 8, 2007, Office Action, mailed Mar. 18, 2009.

U.S. Appl. No. 11/716,364, filed Mar. 8, 2007, Office Action, mailed May 7, 2012.

U.S. Appl. No. 11/716,364, filed Mar. 8, 2007, Office Action, mailed Jul. 3, 2013.

U.S. Appl. No. 11/716,364, filed Mar. 8, 2007, Final Office Action, mailed Jan. 31, 2014.

Zhe, L. et al., "PERF join: an alternative to two-way semijoin and Bloomjoin" Proceedings of the 1995 ACM.

Oracle Database Administrator's Guide, 11g Release 2 (11.2), Chapter 26, Feb. 2010, 54 pages. http://download.oracle.com/docs/cd/E11882_01/server.112/e10595.pdf.

Oracle Database Administrator's Guide, 10g Release 2 (10.2), Chapter 24, May 2006, 34 pages, http://download.oracle.com/docs/cd/B19306_01/server.102/b14231.pdf.

O'Neil, P. et al., "Multi-table joins through bitmapped join indices," SIGMOD Record, ACM, New York, NY, US, vol. 24, No. 3, Sep. 1, 1995, pp. 8-11, ISSN 0163-5808.

Mackert, F. et al., "R* optimizer validation and performance evaluation for local queries" SIGMOD Record, ACM, New York, NY, US, vol. 15, No. 2, Jun. 1, 1986, pp. 85-95, ISSN: 0163-5808.

Loizos, M. et al., "Improving distributed join efficiency with extended bloom filter operations," Advanced Networking and Applications, 2007.

IBM, "A Scheduling Algorithm for Processing Mutually Exclusive Workloads in a multi-systems Configuration," Aug. 19, 2002, IEEE, pp. 1-3.

* cited by examiner

MANAGEMENT OF SHARED STORAGE I/O RESOURCES

RELATED APPLICATION DATA AND CLAIM OF PRIORITY

This application claims the benefit as a Continuation of application Ser. No. 11/716,364, filed Mar. 8, 2007, titled "Management Of Shared Storage I/O Resources", the entire contents of which is hereby incorporated by reference as if fully set forth herein, under 35 U.S.C. §120. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates generally to data management and, more specifically, to techniques for managing shared storage I/O resources.

BACKGROUND

There are many computing scenarios in which computer software applications issue I/O requests on behalf of multiple clients, such as operating systems, web applications, database servers, etc. For example, in the context of a database system, database servers use various types of system resources on behalf of applications that the servers are servicing. Such system resources include, for example, CPU, memory, network, and I/O resources. While processor speeds have increased as much as tenfold in recent years, the speed of a disk drive has barely doubled in the last decade or so. Now, the overall performance of a database system, for example, is typically more bound by I/O than any other resource type, and the overall throughput of the system is determined by the speed of the slowest component in the system. Hence, when the I/O subsystem is not managed correctly, the overall throughput of the system suffers.

Common problems for Information Technology administrators include (a) a particular application itself issues too many I/Os (input/output or read/write requests), placing undue stress on the storage system, and/or (b) a specific workload, application, or session within the system issues too many I/Os, negatively interfering with the performance of other users. Administrators may handle problem (a) in multiple ways, most typically by dedicating storage exclusively to an application to avoid any interference from other applications. Alternatively, administrators may utilize a storage system whose performance capabilities provide sufficient capacity for all applications sharing the storage. Administrators face a more difficult challenge with handling problem (b), whereby the administrators may separate heavily-conflicting workloads onto separate systems. A common example in the database context is configuring separate OLTP (online transaction processing) and reporting databases, however, this solution requires that the data in these separate databases be synchronized. Administrators may also require I/O intensive jobs to be run at off-peak hours, or may only allow a certain number of I/O intensive users to be concurrently logged onto the system. Furthermore, many tools, such as data backup applications, slow down the workload issued to the storage system. In all of the foregoing approaches, the administrator has to "manually" enforce the I/O usage of the application and of the individual users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
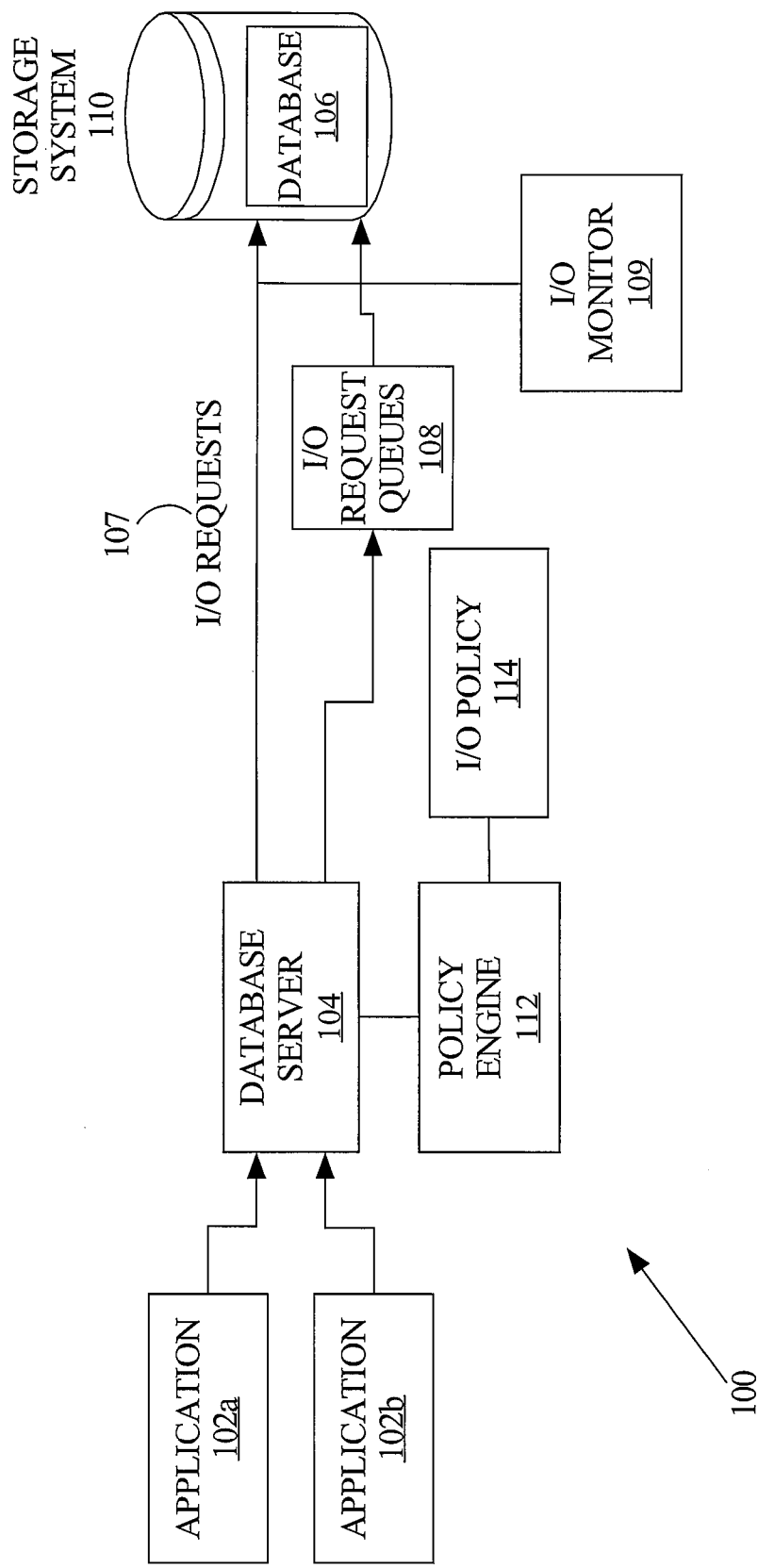
FIG. 1 is a block diagram illustrating an example operating environment in which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Automated management of shared resources, such as shared I/O resources, involves use of a policy engine for implementing I/O scheduling groups' I/O policies. An I/O policy is used for determining whether I/O requests from various I/O scheduling groups should be issued to a shared storage system immediately or should be delayed via corresponding policy-based queues. Thus, an administrator can specify a policy regarding how I/O resources should be used and the system itself enforces the policy, rather than requiring the administrator enforce the I/O usage of the application and of the individual users.

According to an embodiment, in response to receiving an I/O request to a storage system, an I/O scheduling group that is associated with the request is identified and an I/O policy is read. An I/O rate is determined, which characterizes the rate at which I/O operations have recently been issued to the storage system for the I/O scheduling group. Then it is determined whether or not to place the request in an I/O request queue based on the I/O rate and the I/O policy. If it is determined that the request should not be immediately issued to the storage system, then a particular I/O request queue in which to place the request is identified and the request is placed in the particular queue. For example, the I/O policy may specify a maximum I/O rate and/or a maximum I/O data throughput for the corresponding I/O scheduling group, which is compared to the actual recent I/O rate and/or I/O data throughput for the storage system for the I/O scheduling group, to determine whether to immediately issue or to queue the I/O request. If the request is placed in a queue, then the request is eventually issued to the storage system when the request is output from the queue at a time that complies with the I/O policy, such as at a time when the maximum I/O rate and/or maximum I/O data throughput are not exceeded for the particular I/O scheduling group.

According to an embodiment, in response to receiving an I/O request to a storage system, it is determined whether the I/O request involves a small amount of data or a large amount of data. If the I/O request involves a small amount of data, then basing the I/O processing of the I/O request based on an IOPS (number of I/Os per second) limit of the storage system. If the I/O request involves a large amount of data, then basing the I/O processing of the I/O request based on the MBPS (megabytes of I/O per second) limit of the storage system.

These shared I/O resource management techniques are significant because they allow multiple groups of users or applications to share system resources such that they contend with each other in a user-specified and efficient way. Because the system resources can be more effectively shared, administrators can reduce both their licensing and hardware costs, as well as administrative overhead costs. The I/O limits can be enforced with all types of storage systems, e.g., SAN (Storage Area Network), NAS (Network-Attached Storage), and DAS (Direct Attached Storage) systems. Such techniques are superior to other approaches because these techniques implement sharing policies that are rigorously adhered to, and do not require application rewrites or human policing to implement. Additionally, other approaches cannot adhere to policies that specify certain percentages of I/O usage, or allow unused I/O allocations to be "donated" to other I/O scheduling groups in real time, to allow the I/O resources to be utilized efficiently.

Example Operating Environment-Database System

FIG. 1 is a block diagram illustrating an example operating environment 100 in which an embodiment of the invention may be implemented. Operating environment 100 generally depicts a database system, however, implementations of the invention are not limited to use with a database system. Operating environment 100 comprises an application 102a and an application 102b (collectively, applications 102) communicatively coupled to a database server 104. Database server 104 is communicatively coupled to a database 106, where database 106 is physically stored in a storage system 110. Database server 104 is associated with a policy engine 112, which has access to one or more I/O policies 114, for use in issuing I/O requests 107 to storage system 110 either directly or via I/O request queues 108. An I/O monitor 109 is configured to monitor the I/O requests issued to storage system 110.

Applications 102 represent any computer software application or module that operates in conjunction with, or is integrated within, a database server 104. Operation of applications 102 requires read and/or write access, via database server 104, to data in database 106, which is stored in storage system 110. Hence, applications 102 are capable of submitting one or more requests to database server 104, where such requests can include requests for reading and/or writing data to database 106, i.e., I/O requests 107 for one or more I/O operations with data stored in storage system 110. The number of applications communicatively coupled to database server 104 may vary from implementation to implementation and, therefore, the two applications 102a and 102b are depicted in FIG. 1 for purposes of example. Application 102a and application 102b may have the same or different operational requirements. For example, application 102a may have different I/O resource usage requirements and patterns than application 102b. Consequently, a database administrator may want to establish different I/O constraints for each of multiple I/O scheduling groups corresponding to applications 102a and 102b, regarding I/O operations with database 106 and thus with storage system 110.

A database system typically comprises one or more clients that are communicatively coupled to a database server that is connected to a shared database. "Database server" may refer collectively to a cluster of server instances and machines on which the instances execute. Generally, a server is a combination of integrated software components and an allocation of computational resources, such as memory and processes for executing the integrated software components on a processor, where the combination of the software and computational resources are dedicated to providing a particular type of function on behalf of clients of the server. Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server, which submits such requests to a persistent memory mechanism.

A database comprises data and metadata that is stored on a persistent storage system, such as a set of hard disks. Such data and metadata may be logically stored in a database according to relational and/or object-relational database constructs, for example. Database applications interact with a database server by submitting to the database server commands that cause the database server to perform operations on data stored logically in a database but physically in a persistent storage system. A database command that is sent from a database application to a database server contains an original statement of the database command. For the database server to process the commands, the commands must conform to a database language supported by the database server.

As discussed, a database system typically comprises one or more clients that are communicatively coupled to a database server that is connected to a shared database. For example, applications 102 are clients of database server 104, which is coupled to a shared database 106. Database server 104 is a combination of integrated software components and an allocation of computational resources, such as memory and processes for executing the integrated software components on a processor, for providing a particular type of function on behalf of clients of the database server 104. Database server 104 governs and facilitates access to database 106, processing requests by applications 102 to access the database 106 through respective database sessions. Through database sessions, the applications 102 can issue a series of requests (e.g., requests for data and/or metadata) to the database server 104.

Database 106 comprises data and metadata that is stored on a persistent memory mechanism, such as storage mechanism 110. Such data and metadata may be logically stored in a database according to relational and/or object-relational database constructs, for example. Database applications 102 interact with a database server 104 by submitting to the database server 104 commands that cause the database server 104 to perform operations on data in database 106. A database command that is sent from a database application to a database server contains an original statement of the database command, where such statements and commands are also referred to generally herein as "requests". For the database server to process the commands, the commands must conform to a database language supported by the database server, such as the Structured Query Language (SQL).

The term "database" is often used to refer collectively to both (a) the data and metadata that is logically structured according to a database schema and stored on a persistent memory mechanism, and (b) the storage mechanism on which such data and metadata is stored. However, in FIG. 1, database 106 is depicted separately from storage system 110. Thus, in FIG. 1 database 106 represents the data and metadata and storage system 110 represents the actual persistent memory system on which database 106 is physically stored. The data storage technology on which storage system 110 is based may vary from implementation to implementation. For non-limiting examples, storage system 110 may be implemented based on SAN (Storage Area Network), NAS (Network-Attached Storage), and DAS (Direct Attached Storage) systems.

Non-volatile memory is typically used for the task of secondary storage or long-term persistent storage. Non-limiting examples of storage system 110 include hard disk systems, magnetic tape systems, optical disc drive systems, and early computer storage methods such as paper tape and punch cards. One common example of a storage system 110 comprises a system of hard disks, which are digitally encoded non-volatile storage devices that store data on rapidly rotating platters with magnetic surfaces. Strictly speaking, a "hard disk drive" refers to an entire unit containing multiple platters, a read/write head assembly, driver electronics, and motor while "hard disk" (sometimes "platter") refers to the storage medium itself.

Various techniques are described herein in the context of a hard disk drive storage system. However, embodiments of the invention are not limited to use with a hard disk drive or any of the foregoing examples of storage systems, and embodiments may be implemented for use with any type of data storage technology and protocol known now or developed in the future. Furthermore, because both non-volatile and volatile storage systems support I/O operations, embodiments of the invention may be implemented for use with volatile memory as well as with non-volatile memory.

In processing database I/O requests 107 to storage system 110, a policy engine 112 associated with database server 104 uses an I/O policy 114 to manage the I/O requests 107, in a manner which is described in greater detail herein. Generally, the policy engine 112 analyzes I/O constraints associated with I/O requests 107, where such constraints are specified for each of multiple I/O scheduling groups in an I/O policy 114. I/O constraints are analyzed in view of the recent I/O loads on the storage system 110, as tracked by I/O monitor 109, to determine whether or not to immediately issue such I/O requests to storage system 110. If the recent I/O loads on the storage system 110 in view of the I/O policy 114 do not allow for immediate submission of any particular I/O requests 107, then the policy engine 112 decides to place such I/O requests 107 in an I/O request queue 108 associated with the particular I/O scheduling group from which the I/O request was submitted. From the I/O request queues 108, the I/O requests 107 are issued to storage system 110 at the appropriate time based on the I/O constraint corresponding to each I/O request 107, where the relevant I/O constraint used is based on the particular I/O scheduling group from which the I/O request was submitted.

Policy engine 112 may comprise, for example, an integrated software component of database server 104 or may be an external software component communicatively coupled to database server 104. As such, policy engine 112 comprises one or more sequences of instructions which, when executed by one or more processors, cause execution of one or more operations, processes or process steps. I/O monitor 109 may comprise, for example, an integrated software component of database server 104, may comprise an integrated software module of policy engine 112, or may be an external software component communicatively coupled to database server 104 and/or storage system 110.

I/O scheduling groups are groups of users, or sessions, that are grouped together based on their processing needs. An I/O policy 114 specifies the I/O scheduling groups belonging to the I/O policy 114, and contains directives for how I/O resources are to be allocated among these groups, e.g., I/O constraints pertaining to each of the groups. An I/O policy 114 can also contain sub-policies, and can designate how I/O resources are allocated among the sub-policies. Sub-policies then allocate their share of the allocation among their own I/O scheduling groups and sub-policies. I/O policy directives specify how resources are allocated among I/O scheduling groups and sub-policies. Thus, each I/O policy 114 specifies a set of resource constraint directives, typically administrator-configured, regarding the rate at which I/O operations can be performed on storage system 110 for one or more sessions associated with the I/O scheduling groups with which the I/O policy 114 corresponds. For example, an I/O policy 114 may be configured for multiple databases sharing the same storage, for multiple database server instances sharing the same database, and/or for multiple user groups using one or more associated database server instances within a database system.

I/O request queues 108 are buffers where various I/O request data and/or objects are stored and waiting to be processed. Stated otherwise, I/O request queues 108 are data structures where various I/O request data and/or objects are temporarily stored and waiting to be issued to storage system 110 to actually execute a read operation or a write operation on data. According to an embodiment, a separate I/O request queue 108 is associated with each I/O scheduling group. Thus, each I/O policy 114 can be enforced through the I/O request queues 108 that correspond to the I/O scheduling groups governed by the I/O policy 114, where the rate at which I/O requests 107 are output from a given I/O request queue 108 is made to comply with the I/O policy 114.

I/O Resources

The type of I/O requests (also referred to simply as "I/Os") issued by database server 104 processes, and the type of resources consumed by the I/Os, are as follows. The database I/O workload typically consists of small random I/Os and large sequential I/Os. The small random I/Os are more prevalent in an OLTP (online transaction processing) application environment where each session reads a data block into a buffer cache for updates and the changed blocks are written in batches by a write process. Large sequential I/Os are common in a batch or reporting application environment. The OLTP application performance depends on how fast the small I/Os are serviced, which depends on how fast the disk can spin and seek to the data. The large I/O performance depends on the capacity of the I/O channel that connects the server to the storage array. The larger the capacity of the channel, the better the I/O throughput.

IOPS (I/Os Per Second)

"IOPS" refers to a number of I/O requests per second. This metric represents the number of small random I/Os that can be serviced in a second. The IOPS rate mainly depends on how fast the disk media can spin, for example. The IOPS rate from a storage system 110 can be increased either by adding more disk drives or by using disk drives with a higher RPM (Rotations Per Minute) rate. According to an embodiment, IOPS is used as a critical performance metric when partitioning and managing I/O resources, as measured and tracked per I/O scheduling group by I/O monitor 109 (FIG. 1). If the storage system's I/O request for second rate is responsible for bottlenecks, then limiting maximum IOPS is effective.

MBPS (MBYTES Per Second)

"MBPS" refers to a number of megabytes of data per second. The rate at which data can be transferred between the computing server node and the storage system 110 depends on the capacity of the I/O channel that is used to transfer data. The higher the bandwidth of the I/O channel, the more data can be transferred in a given time period. The throughput of a streaming data application, for example, depends on how fast this data can be accessed and is measured using the MBPS metric. Even though the disks themselves have an upper limit on the amount of sequential data they can transfer, it is often the channel capacity that limits the overall throughput of the system. For example, a host connected to a NAS server through a GigE switch is limited by a transfer capacity of 128 MBPS. Hence, according to an embodiment, partitioning and managing I/O resources are based on throttling this channel resource, as measured and tracked per I/O scheduling group by I/O monitor 109 (FIG. 1). If the storage system's I/O data throughput is responsible for bottlenecks, then limiting maximum MBPS is effective.

I/O Scheduling

I/O resource usage is not readily measurable at the level of individual requests, without special hardware and/or driver support. I/O requests often go through various layers of software and hardware virtualization and can get queued and controlled in each of these layers. This makes it virtually impossible to determine fixed computation costs for each of the I/O requests. These various I/O layers combined with caching at the storage array create the semblance of one or a few contiguous disks, hiding a combination of caches and multiple disk spindles in the back-end.

Partitioning the outstanding virtual queue of I/O requests (which includes requests currently being serviced by the disks, requests in-flight, and requests being queued at the OS, array controller or disk) and limiting the depth of this queue based on latency assumes full control over the disk subsystem and precise scheduling of outgoing requests. However, precise ordering of I/O requests is an unproductive exercise in the context of database system I/Os, given the intermediaries that reorder requests to optimize disk utilization.

Criteria that consider the perceived disk proximity of requests in identifying request costs are not very effective, because proximity at the database file level may not equate to proximity at the disk. Even in the case where the complete file topology is known, there is not a guarantee that the I/O requests that are adjacent to each other will get issued in the same order because the disk I/O subsystem is likely getting bombarded with requests from other processes.

Approaches based on outstanding I/Os charge clients for their share of the outbound queue depth. Specifically, each I/O is counted only for the duration it is outstanding in the outbound queue. Thus, some disk subsystems implicitly favor small I/Os over large I/Os. Consequently, clients issuing large I/Os are "charged" extra for each of their I/O requests, independent of the per-request resource consumption.

In view of the foregoing considerations, according to one embodiment, I/O resource usage is monitored over intervals of time in terms of the two important I/O metrics: IOPS and MBPS. For example, consider a case that consists of a purely OLTP workload where the user has specified an I/O policy to distribute available I/O bandwidth between two I/O scheduling groups, CG1 and CG2, at a 60:40 ratio. If the total capacity on the system is 1000 IOPS, each of these I/O scheduling groups is allowed to issue 600 and 400 IOPS, respectively. This means that within a defined quanta interval, a request from CG1 should be submitted 60% of the time and a request from CG2 should be submitted 40% of the time. In the absence of requests from one of the CGs, the available extra bandwidth should be utilized to service requests from other I/O scheduling groups. If the storage system has a max capacity of 1000 IOPS and the quanta were chosen as 10 ms intervals, then only 10 I/Os would be allowed to queue during that period.

According to an embodiment, if a database system is hosting a batch or reporting application and the I/O bandwidth is shared across multiple processes issuing large streaming I/Os, the MBPS metric is used to partition the I/O bandwidth. In this case, the processes are contending for the I/O channel to transfer the large data buffers to and from the storage. Partitioning the I/O resources gets complicated when there is a mixed workload in the system. For example, an OLTP system with an occasional backup job or report query has both large and small I/Os. These two workloads consume different types of resources (e.g., channel and I/O resources), but they affect the performance of each other. Because it is very difficult to convert the I/O resource consumption into a single metric, according to one embodiment, rules within the I/O policy 114 are applied separately for both types of resources (IOPS and MBPS), depending on the type of I/O. Furthermore, in order to schedule the I/Os to meet the I/O policy 114, the max load capacity of the storage system provides useful information. The max load capacity may be known and provided to the database system. Otherwise, an I/O calibration tool (e.g., a package of executable procedures) can be executed to find the load capacity of the storage system 110.

In a dedicated storage configuration for a database system, a single database is the sole user of the storage system 110. In this configuration, the database server 104 can automatically determine the maximum load capacity of the storage system 110, and manage the I/O resources across the I/O scheduling groups. In a shared storage configuration for a database system, the storage system 110 is shared by multiple databases or other applications. When storage is shared with other databases, it is possible to implement a database server 104 that can communicate with other database servers and schedule the I/Os in such a way that I/O bandwidth that is not needed by one database server can be donated to another database server. This implementation would effectively utilize the entire I/O resource capacity of the storage by using a low-latency communication module between the database servers so that the current usage of one database server is known to the other participating database servers. Even in scenarios in which the current usage of one database server is not known to the other participating database servers, users are allowed to set a maximum resource usage capacity on a per-IOPS and per-MBPS basis for each database with shared storage configurations. For example, if a storage system 110 is shared between an OLTP database and a read-intensive batch or reporting database, capping the maximum I/O usage of the batch or reporting database can provide more reliable I/O performance for the OLTP database. Alternatively or additionally, the I/O resource management techniques described herein could be implemented within the storage system's controller, to enforce a policy between multiple applications issuing I/O requests to the storage system.

Depending on the storage system 110, read and write requests may have different costs. For example, some storage arrays can sustain significantly higher small write IOPS than read IOPS, due to smart cache flushing in the array controller. As a counter-example, writes can be more expensive than reads with the use of mirroring and parity. Hence, according to an embodiment, reads and writes are accounted for separately when determining the I/O capacity and resource consumption rates.

A Method for Managing Shared I/O Resources

Figure 2:
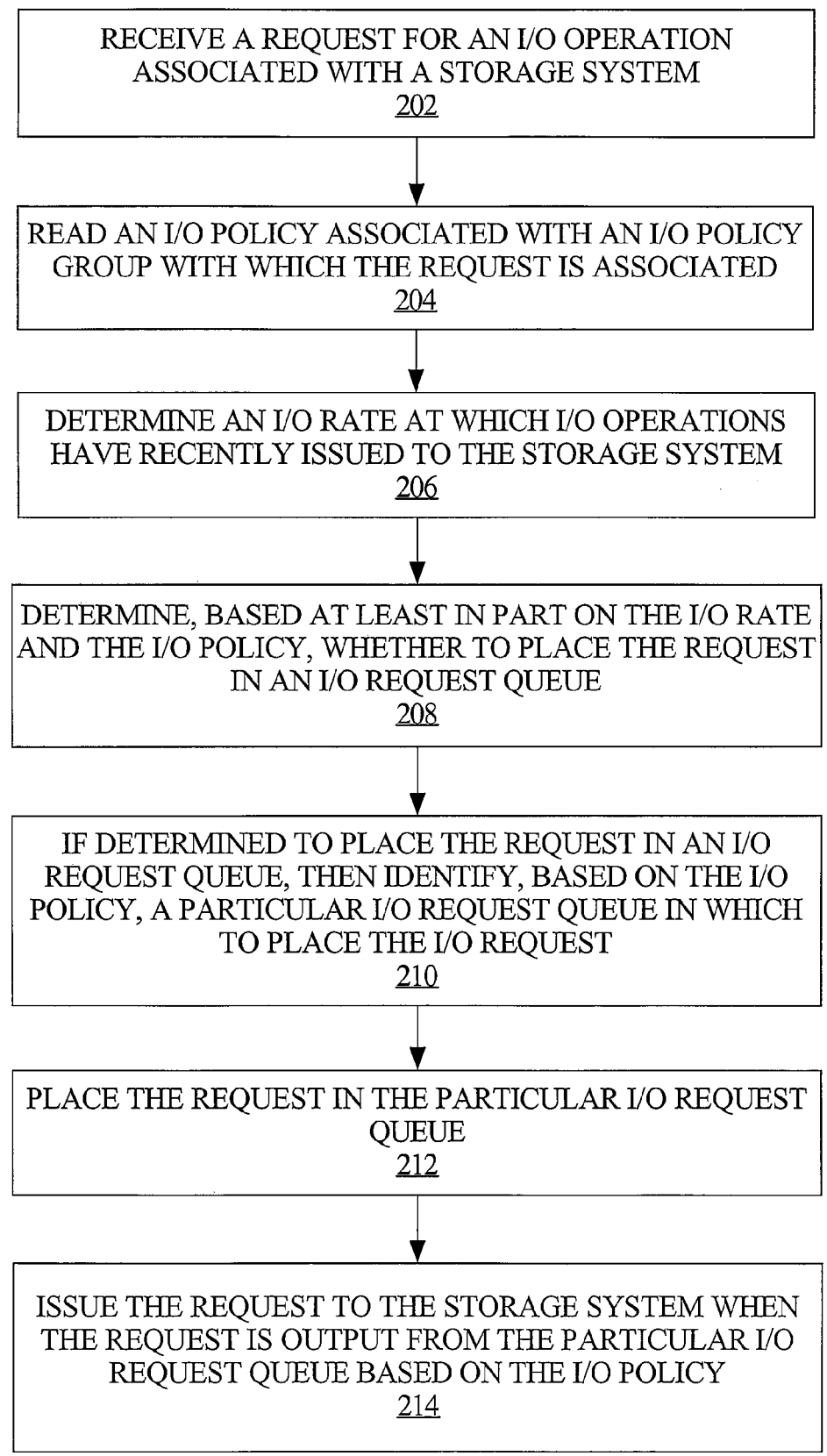
FIG. 2 is a flow diagram that illustrates a method for managing shared I/O resources, according to an embodiment of the invention.

FIG. 2 is a flow diagram that illustrates a method for managing shared I/O resources, according to an embodiment of the invention. The method depicted in FIG. 2 is a computer and/or machine-implemented method in which a computer or machine performs the method, such as by one or more processors executing instructions. For example, the method may be performed on or by a computer system such as computer system 500 of FIG. 5.

At block 202, an I/O request is received, where the I/O request is a request for an I/O operation associated with a storage system. For example, an I/O request 107 (FIG. 1) is received at a database server 104 (FIG. 1) from an application 102a (FIG. 1). Because the database system is configured to implement the I/O resource management techniques described herein, a database administrator has configured an I/O policy 114 (FIG. 1) for governing corresponding I/O scheduling groups. For a non-limiting example, the administrator may configure an I/O policy for groups consisting of corporate executives, IT (information technology) employees, and various groupings of the remainder of the employees. Each I/O request received at the database server 104 is submitted to the database server 104 from a particular entity, e.g., a particular user, session, and/or application 102a, 102b (FIG. 1). Thus, the I/O request received at block 202 is associated with a particular I/O scheduling group.

The I/O limits for this storage system, if not already known, are determined. Furthermore, because each I/O request received is associated with a particular I/O scheduling group, the particular I/O scheduling group associated with the I/O request received at block 202 is determined. The particular I/O scheduling group with which the I/O request is associated could be identified, for non-limiting examples, by user login information or by user session information.

At block 204, an I/O policy is read, which governs an I/O scheduling group with which the I/O request is associated. The system could be configured with multiple I/O policies, where each I/O policy applies to certain time periods, for example. For example, the administrator may want to give priority to I/O requests from corporate executives during the day but give priority to I/O requests for IT personnel at night. Once the appropriate I/O policy 114 is read, then policy engine 112 processes the I/O request 107 to enforce policy rules embodied in the I/O policy 114.

At block 206, an I/O rate at which I/O operations have recently issued to the storage system is determined. According to an embodiment, the I/O requests 107 (FIG. 1) actually issued to storage system 110 (FIG. 1) are constantly monitored and relevant metrics tracked by I/O monitor 109 (FIG. 1). For example, the IOPS and MBPS issued to storage system 110 over some period of time in association with particular I/O scheduling groups are monitored by I/O monitor 109. The period of time over which the relevant metrics are tracked by I/O monitor 109 may vary from implementation to implementation, with the general goal being to track at a useful level the recent history of I/O requests to the storage system 110.

At block 208, based at least in part on the I/O rate determined at block 206 and the I/O policy read at block 204, whether or not to place the I/O request in an I/O request queue is determined. For example, policy engine 112 (FIG. 1) determines whether or not too many IOPS have recently been submitted to storage system 110 (FIG. 1) in view of the governing I/O policy 114 (FIG. 1) and the most recent I/O rate for the I/O scheduling group from which the I/O request was submitted, as monitored by I/O monitor 109 (FIG. 1). According to an embodiment, whether or not to place the I/O request in an I/O request queue is determined at block 208 based further on the throughput rate (e.g., MBPS) at which data has recently been read from or written to the storage system 110. For example, policy engine 112 (FIG. 1) determines whether or not too many MBPS have recently been submitted to storage system 110 in view of the I/O policy 114 and the most recent throughput rate for the I/O scheduling group from which the I/O request was submitted, as monitored by I/O monitor 109. One approach for determining whether to place the I/O request in an I/O request queue or to immediately issue the I/O request is described in greater detail in reference to FIG. 3. Another approach for determining whether to place the I/O request in an I/O request queue or to immediately issue the I/O request is described in greater detail in reference to FIG. 4.

If it is determined at block 208 to place the I/O request in an I/O request queue, then at block 210 a particular I/O request queue in which to place the request is identified. For example, because a separate I/O request queue 108 (FIG. 1) is associated with each I/O scheduling group, policy engine 112 (FIG. 1) identifies which particular I/O request queue 108 is associated with the I/O scheduling group with which the I/O request 107 (FIG. 1) is associated.

At block 212, the I/O request received at block 202 is placed in the particular I/O request queue identified at block 210. For example, in response to a message from policy engine 112 (FIG. 1), database server 104 (FIG. 1) places the I/O request 107 (FIG. 1) in the corresponding I/O request queue 108 (FIG. 1). The I/O request queue 108 enables throttling of I/O requests associated with the particular I/O scheduling group according to the I/O policy 114 (FIG. 1), by delaying issuance of the I/O request 107 to the storage system 110 (FIG. 1), until sufficient I/O resources are available at storage system 110 for use by the particular I/O scheduling group.

At block 214, the I/O request is issued to the storage system when the request is output from the particular I/O queue based on the associated I/O policy. For example, when sufficient IOPS and/or MBPS are available at storage system 110 (FIG. 1) for use by the particular I/O scheduling group, database server 104 (FIG. 1) actually issues the I/O request 107 (FIG. 1) from the particular I/O request queue 108 (FIG. 1) to the storage system 110. As mentioned, I/O monitor 109 (FIG. 1) constantly monitors the I/O requests issued to storage system 110 and, therefore, I/O monitor 109 records information about this particular I/O request generally for use in processing other I/O requests.

As mentioned, I/Os are throttled within predefined quantum time intervals. The length of this quantum will determine how often processes are put to sleep in order to meet I/O resource usage I/O policy directives specified in I/O policy 114 (FIG. 1). Setting the quantum to a relatively higher value will allow bursty traffic from a low priority I/O scheduling group to be scheduled and can affect the performance of a high priority I/O scheduling group. The initial value of this quantum may be determined through heuristics.

With I/O scheduling, processes with I/Os to be scheduled are selected based on their I/O resource allocation. For example, if a particular I/O resource group (e.g., I/O scheduling group $CG_1$) has a 20% allocation, the IOPS limit is 1000, and the time quantum is 200 ms, then $CG_1$ will be limited to 40 I/Os per quantum. If the other I/O scheduling groups are lightly loaded with less than 160 IOPS for the quantum, $CG_1$ will be able to use the rest of the I/O capacity. Similarly, if the MBPS limit is 200, $CG_1$ will be limited to 8 MB worth of I/O per 200 ms quantum, assuming other I/O scheduling groups are fully loaded.

In a database cluster environment with multiple database server instances performing I/Os to dedicated storage that is shared among the cluster, the I/O capacity could be partitioned and managed among the instances in the cluster, similarly to as described in reference to FIG. 2.

Methods for Determining how to Issue an I/O Request

Figure 3:
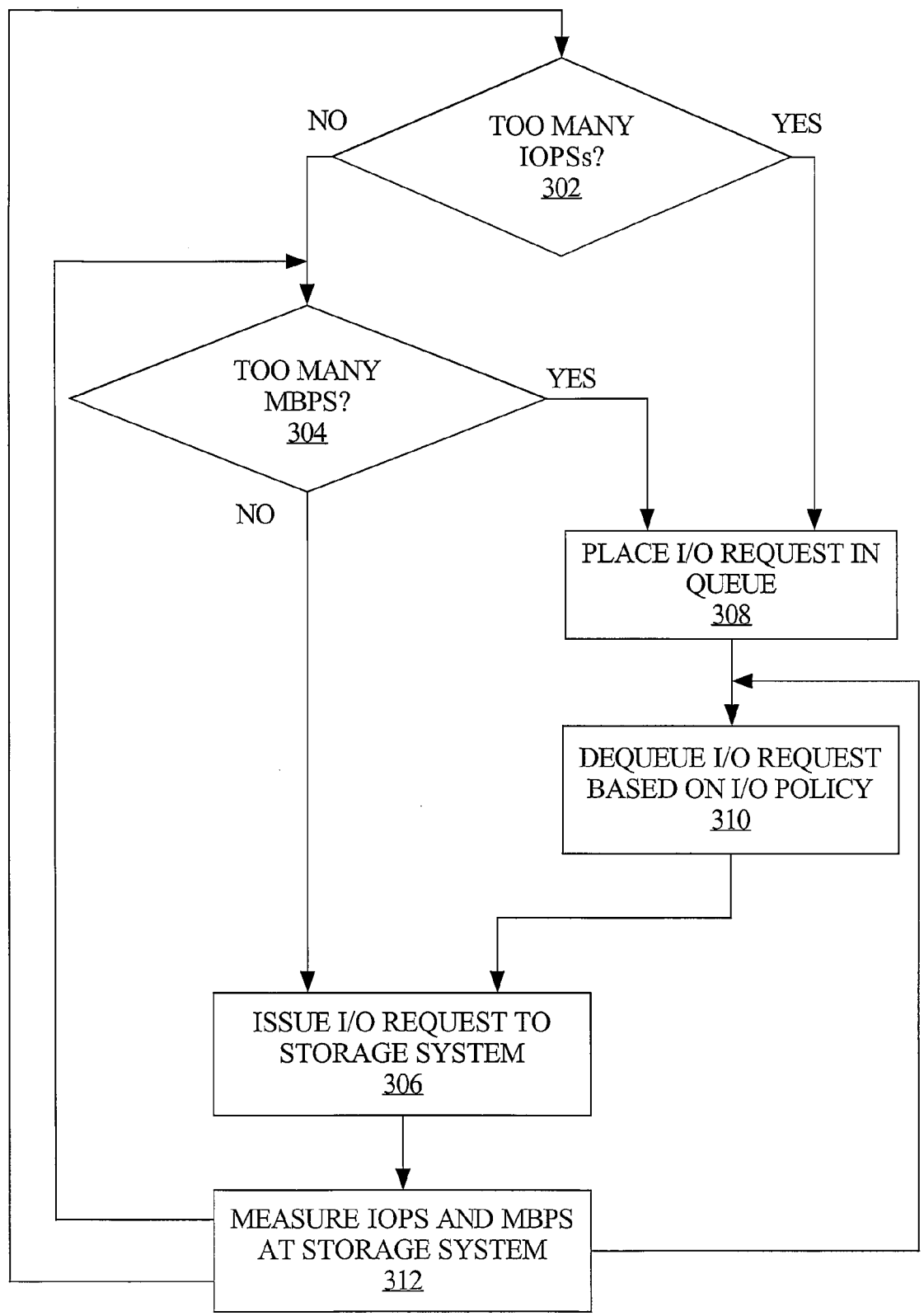
FIG. 3 is a flow diagram that illustrates a method for determining how to issue an I/O request to a storage system, according to an embodiment of the invention.

FIG. 3 is a flow diagram that illustrates a method for determining how to issue an I/O request to a storage system, according to an embodiment of the invention. The method depicted in FIG. 3 is a computer and/or machine-implemented method in which a computer or machine performs the method, such as by one or more processors executing instructions. For example, the method may be performed on or by a computer system such as computer system 500 of FIG. 5. The method depicted in FIG. 3 can be implemented as a detailed method for performing portions of the method illustrated in FIG. 2 (e.g., blocks 208, 212, 214).

At block 302, it is determined whether too many IOPS have recently issued to the storage system. For example, policy engine 112 (FIG. 1) determines whether or not too many IOPS have recently been issued to storage system 110 (FIG. 1) in view of the I/O policy 114 (FIG. 1) directive associated with the I/O request 107 (FIG. 1) currently being processed, and the most recent I/O rate (e.g., in IOPS) for that corresponding I/O scheduling group, as monitored by I/O monitor 109 (FIG. 1). For example, the maximum I/O rate for the particular I/O scheduling group is compared to the recent I/O rate for the I/O scheduling group to determine whether the group has met its limit of IOPS for the certain time quantum. If too many IOPS have not issued, then control passes to block 304.

At block 304, it is determined whether too many MBPS have recently issued to the storage system. For example, policy engine 112 (FIG. 1) determines whether or not too many MBPS have recently been issued to storage system 110 (FIG. 1) in view of the I/O policy 114 (FIG. 1) directive associated with the I/O request 107 (FIG. 1) currently being processed, and the most recent throughput rate (e.g., in MBPS) for that corresponding I/O scheduling group, as monitored by I/O monitor 109 (FIG. 1). For example, the maximum data throughput rate for the particular I/O scheduling group is compared to the recent data throughput rate for the I/O scheduling group to determine whether the group has met its limit of MBPS for the certain time quantum.

If too many MBPS have not issued at block 304, then control passes to block 306, at which the I/O request currently being processed is issued to the storage system. If too many MBPS have issued at block 304, then control passes to block 308, at which the I/O request currently being processed is placed in an I/O request queue. For example, in response to a message from policy engine 112 (FIG. 1), database server 104 (FIG. 1) places the I/O request 107 (FIG. 1) in the corresponding I/O request queue 108 (FIG. 1).

Returning to block 302, if too many IOPS have issued, then control passes to block 308, at which the I/O request currently being processed is placed in an I/O request queue. For example, in response to a message from policy engine 112 (FIG. 1), database server 104 (FIG. 1) places the I/O request 107 (FIG. 1) in the corresponding I/O request queue 108 (FIG. 1).

At block 310, the I/O request is dequeued based on the I/O policy 114 (FIG. 1). For example, if the I/O policy 114 specifies that an I/O scheduling group has a 20% allocation, and if the IOPS limit is 1000 and the time quantum is 200 ms, then the particular I/O scheduling group will be limited to 40 I/Os per quantum and I/O requests are dequeued from the corresponding I/O queue accordingly. Similarly, if the I/O policy specifies that an I/O scheduling group is limited to 200 MBPS, then the I/O scheduling group will be limited to 8 MB worth of I/O per 200 ms quantum, and I/O requests are dequeued from the corresponding I/O queue accordingly. According to an implementation in which both the I/O rate and throughput rate are considered in managing the I/O resources, both the IOPS constraint and the MBPS constraint should be overcome (i.e., sufficient I/O resources are available) before the I/O request is dequeued from the I/O request queue and issued to the storage system at block 306.

Furthermore, upon issuing an I/O request to the storage system, at block 312 the IOPS and MBPS are measured at the storage system. The IOPS metric and the MBPS metric are fed back to decision blocks 302 and 304, respectively, for determining whether there are enough I/O resources available to issue a particular I/O request in compliance with the corresponding I/O policy directives. Similarly, the IOPS metric and the MBPS metric are fed back to decision block 310 for determining when to dequeue the I/O request for issue to the storage system in compliance with the corresponding I/O policy directives.

Figure 4:
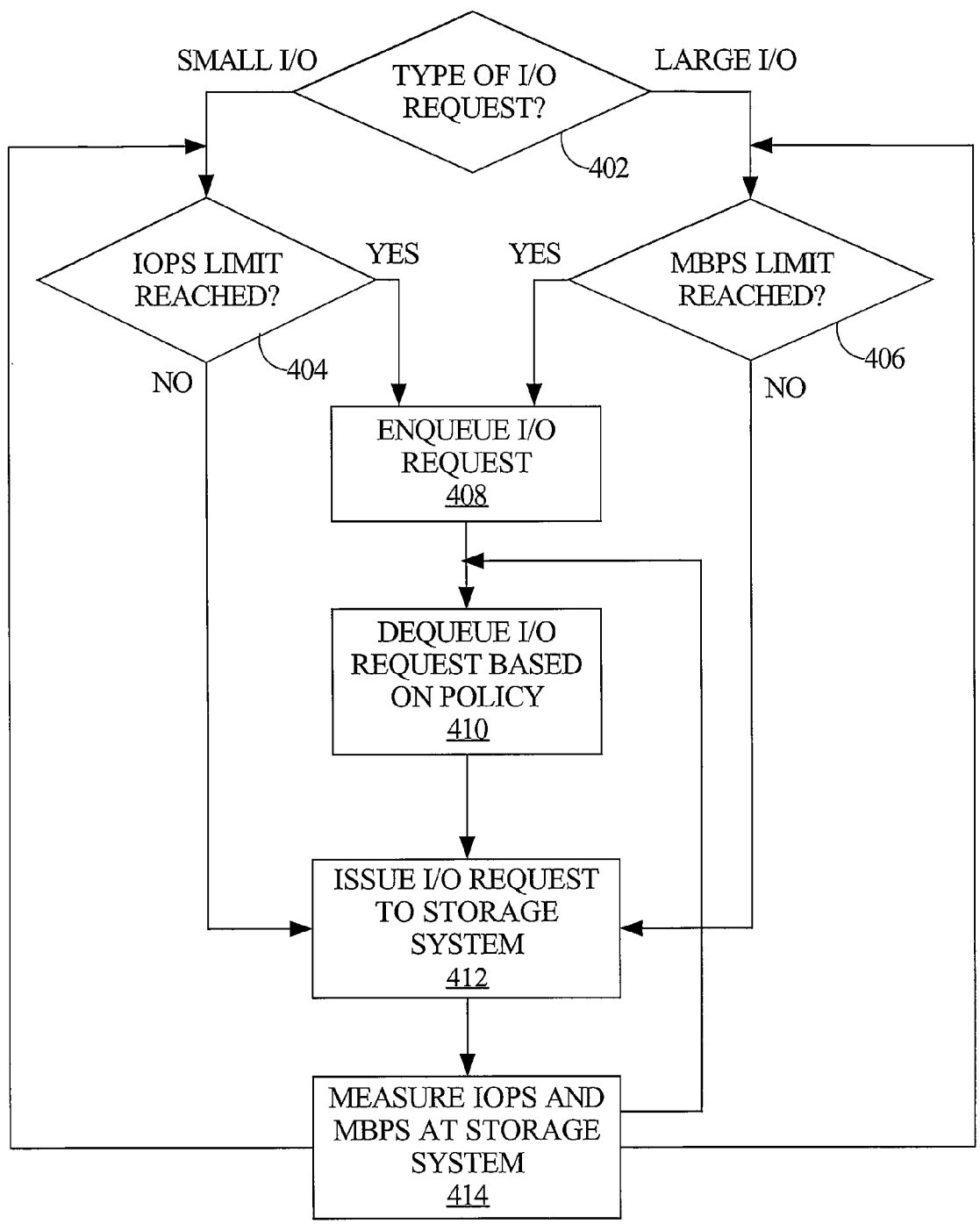
FIG. 4 is a flow diagram that illustrates a method for determining how to issue an I/O request to a storage system, according to an embodiment of the invention.

FIG. 4 is a flow diagram that illustrates a method for determining how to issue an I/O request to a storage system, according to an embodiment of the invention. The method depicted in FIG. 4 is a computer and/or machine-implemented method in which a computer or machine performs the method, such as by one or more processors executing instructions. For example, the method may be performed on or by a computer system such as computer system 500 of FIG. 5.

The storage system has overall limits, e.g., a maximum I/O request rate and a maximum I/O data throughput. It could also be a maximum read rate or write rate. This is either specified by the administrator (for example, in the case of shared storage) or self-determined by the application. Generally, if the application is operating under this maximum I/O rate, then any new I/O request is issued immediately. However, if the application has enough I/O requests such that any of these maximum rates would be exceeded, then the policy engine selects an I/O scheduling group whose turn it is (according to the policy) to issue an I/O to the storage system. I/O requests are thus continually selected so that the application stays at or under the maximum I/O rates.

At block 402, in response to receiving an I/O request, the type of I/O request is determined. Determining the type of I/O request comprises determining whether the request involves a large I/O, i.e., whether the I/O involves a large amount of data, or whether the request involves a small I/O, i.e., whether the I/O involves a small amount of data. The size of the I/O is considered in determining whether the IOPS or the MBPS system limits are considered for further processing of the I/O request.

If the I/O request involves a small amount of data, then control passes to block 404, where it is determined whether the IOPS limit for the storage system is reached. If the IOPS limit for the storage is not reached, then control passes to block 412, at which the I/O request is issued to the storage system. On the other hand, if determined at block 404 that the IOPS limit for the storage is reached, then control passes to block 408, at which the I/O request is placed in an I/O request queue. Once in an I/O request queue, at block 410 the I/O request is dequeued based on the I/O policy currently governing the I/O request process, and the I/O request is issued to the storage system at block 412. When an application 102 (FIG. 1) can safely issue another I/O request 107 (FIG. 1) under the prescribed storage system limits (e.g., IOPS and MBPS limits), then an appropriate I/O scheduling group is selected based on the I/O policy 114 (FIG. 1) and I/O request 107 at the head of the corresponding I/O queue 108 is issued to the storage system 110 (FIG. 1).

If it is determined at block 402 that the I/O request involves a large amount of data, then control passes to block 406, where it is determined whether the MBPS limit for the storage system is reached. If the MBPS limit for the storage is not reached, then control passes to block 412, at which the I/O request is issued to the storage system. On the other hand, if determined at block 406 that the MBPS limit for the storage is reached, then control passes to block 408, at which the I/O request is placed in an I/O request queue. Once in an I/O request queue, at block 410 the I/O request is dequeued based on the I/O policy currently governing the I/O request process, and the I/O request is issued to the storage system at block 412. When an application 102 (FIG. 1) can safely issue another I/O request 107 (FIG. 1) under the prescribed storage system limits (e.g., IOPS and MBPS limits), then an appropriate I/O scheduling group is selected based on the I/O policy 114 (FIG. 1) and I/O request 107 at the head of the corresponding I/O queue 108 is issued to the storage system 110 (FIG. 1).

At block 414, the IOPS and MBPS are measured at the storage system, and fed back to blocks 404 and 406 for use in determining whether the IOPS limit or the MBPS limit, respectively, has been reached. The IOPS and MBPS measurements are also fed back to block 410, where they can be used in evaluating the I/O policy to determine from which I/O queue the next I/O request should be dequeued.

Hardware Overview

Figure 5:
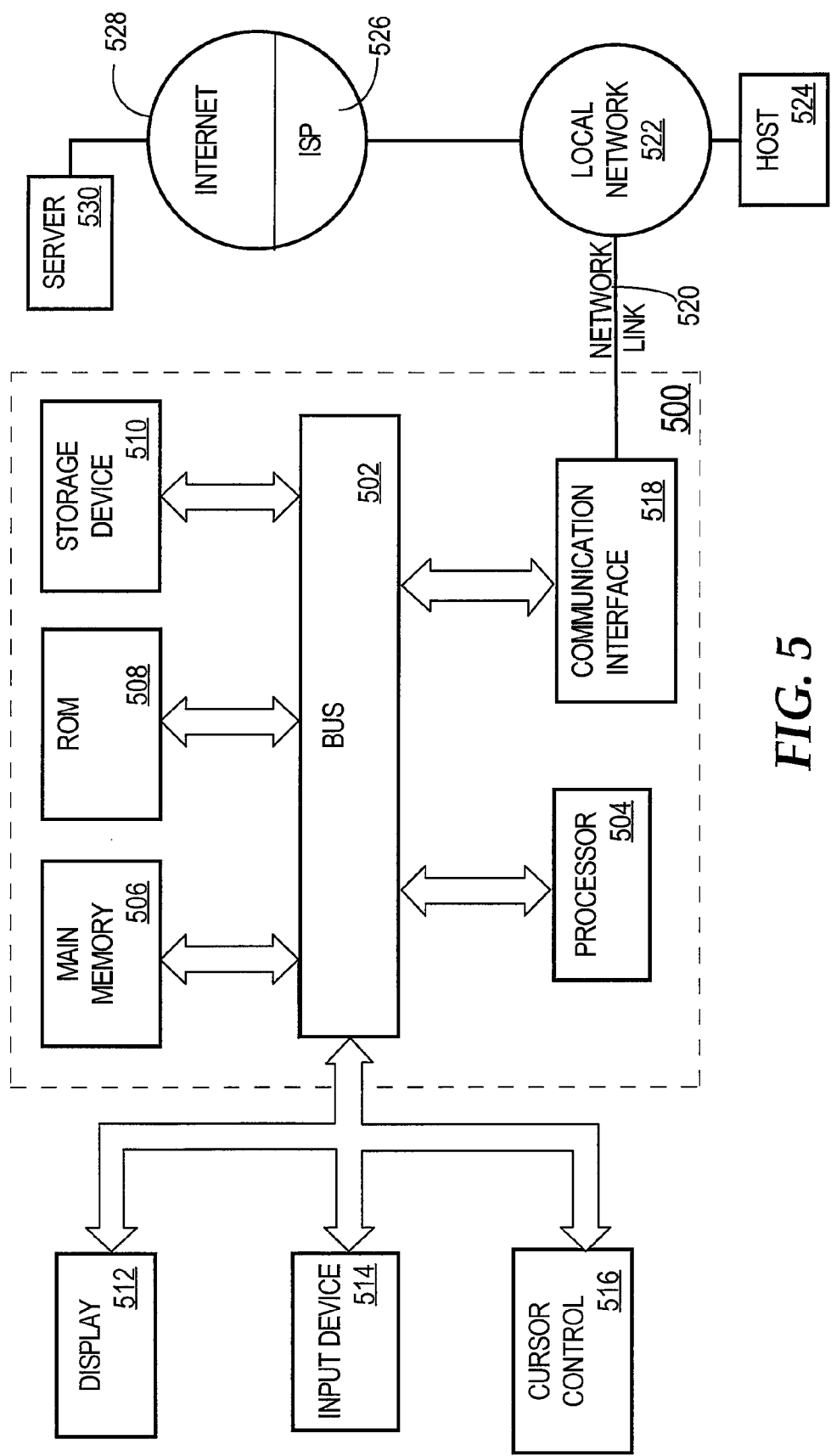
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. For example, embodiments are described throughout in the context of a database system. However, implementations of embodiments of the invention are not limited to use with database systems. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method for managing shared storage input-output (I/O) resources, comprising:
   receiving a request for an I/O operation on a storage system to which a plurality of requests for I/O operations have been recently issued;
   wherein the plurality of requests comprises a first set of requests that are associated with a first I/O scheduling group of a plurality of I/O scheduling groups, and a second set of requests that are associated with a second I/O scheduling group of the plurality of I/O scheduling groups;
   determining an I/O scheduling group of the plurality of I/O scheduling groups with which the received request is associated;
   in response to determining that the received request is associated with the first I/O scheduling group:
      identifying a first I/O policy, associated with the first I/O scheduling group, that specifies a first I/O allocation that dictates a first maximum threshold, wherein the first maximum threshold is one of:
         a first maximum I/O rate at which I/O operations should issue to said storage system for requests associated with said first I/O scheduling group, or
         a first maximum throughput rate at which I/O operations should issue to said storage system for requests associated with said first I/O scheduling group,
      determining an I/O statistic associated with I/O operations that have recently issued to said storage system for said first I/O scheduling group,
      wherein the I/O statistic is one of: I/O rate and I/O throughput;
      determining, based at least in part on whether said I/O statistic indicates that said first maximum threshold has been exceeded, whether to place said request in an I/O request queue, and
      in response to determining to place said request in an I/O request queue:
         placing said request in a particular I/O request queue associated with said first I/O scheduling group, and
         issuing said request to said storage system when said request is dequeued from said particular I/O request queue based on said first I/O policy, for performance of said I/O operation by said storage system;
   wherein a second I/O policy associated with said second I/O scheduling group specifies a second I/O allocation that dictates a second maximum threshold, wherein the second maximum threshold is one of:
      a second maximum I/O rate at which I/O operations should issue to said storage system for requests associated with said second I/O scheduling group, or
      a second maximum throughput rate at which I/O operations should issue to said storage system for requests associated with said second I/O scheduling group;

determining whether said I/O statistic associated with I/O operations that have recently issued to said storage system for said first I/O scheduling group is less than said first maximum threshold; and in response to determining that said I/O statistic is less than said first maximum threshold:
issuing more requests associated with said second I/O scheduling group than prescribed by said second maximum threshold;

wherein the method is performed by one or more computing devices.

2. One or more non-transitory computer-readable media storing instructions, wherein the instructions include:

instructions which, when executed by one or more hardware processors, cause receiving a request for an I/O (input/output) operation on a storage system to which a plurality of requests for I/O operations have been recently issued;

wherein the plurality of requests comprises a first set of requests that are associated with a first I/O scheduling group of a plurality of I/O scheduling groups, and a second set of requests that are associated with a second I/O scheduling group of the plurality of I/O scheduling groups;

instructions which, when executed by one or more hardware processors, cause determining an I/O scheduling group of the plurality of I/O scheduling groups with which the received request is associated;

instructions which, when executed by one or more hardware processors, cause, in response to determining that the received request is associated with the first I/O scheduling group:

identifying a first I/O policy, associated with the first I/O scheduling group, that specifies a first I/O allocation that dictates a first maximum threshold, wherein the first maximum threshold is one of:

a first maximum I/O rate at which I/O operations should issue to said storage system for requests associated with said first I/O scheduling group, or a first maximum throughput rate at which I/O operations should issue to said storage system for requests associated with said first I/O scheduling group, determining an I/O statistic associated with I/O operations that have recently issued to said storage system for said first I/O scheduling group, wherein the I/O statistic is one of: I/O rate and I/O throughput;

determining, based at least in part on whether said I/O statistic indicates that said first maximum threshold has been exceeded, whether to place said request in an I/O request queue, and in response to determining to place said request in an I/O request queue:

placing said request in a particular I/O request queue associated with said first I/O scheduling group, and issuing said request to said storage system when said request is dequeued from said particular I/O request queue based on said first I/O policy, for performance of said I/O operation by said storage system;

wherein a second I/O policy associated with said second I/O scheduling group specifies a second I/O allocation that dictates a second maximum threshold, wherein the second maximum threshold is one of:

a second maximum I/O rate at which I/O operations should issue to said storage system for requests associated with said second I/O scheduling group, or a second maximum throughput rate at which I/O operations should issue to said storage system for requests associated with said second I/O scheduling group;

instructions which, when executed by one or more hardware processors, cause determining whether said I/O statistic associated with I/O operations that have recently issued to said storage system for said first I/O scheduling group is less than said first maximum threshold; and instructions which, when executed by one or more hardware processors, cause, in response to determining that said I/O statistic is less than said first maximum threshold: issuing more requests associated with said second I/O scheduling group than prescribed by said second maximum threshold.

3. The computer-executed method of claim 1, wherein determining whether to place said request in an I/O request queue comprises performing one of:

comparing said I/O statistic to said first maximum I/O rate, wherein said I/O statistic is an I/O rate; or comparing said I/O statistic to said first maximum throughput rate, wherein said I/O statistic is an I/O throughput.

4. The computer-executed method of claim 1, wherein issuing said request to said storage system when said request is dequeued from said particular I/O request queue based on said first I/O policy comprises:

determining the first maximum I/O rate is not exceeded for the first I/O scheduling group; and in response to determining the first maximum I/O rate is not exceeded for the first I/O scheduling group, dequeuing the request from the particular I/O request queue.

5. The computer-executed method of claim 1, further comprising if determined not to place said request in an I/O request queue, then immediately issuing said request to said storage system.

6. The computer-executed method of claim 1, wherein said request is issued to said storage system from a database server.

7. The computer-executed method of claim 1, wherein:

the first I/O allocation is a particular percentage of the total resources, of said storage system, available to satisfy I/O requests from the plurality of I/O scheduling groups; and the method further comprises determining the first maximum I/O rate by determining a quantity of resources that is represented by the particular percentage of the total resources.

8. The computer-executed method of claim 1, wherein:

I/O requests associated with the first I/O scheduling group are received by a first database server; and I/O requests associated with the second I/O scheduling group are received by a second database server.

9. The one or more non-transitory computer-readable media of claim 2, wherein determining whether to place said request in an I/O request queue comprises performing one of:

comparing said I/O statistic to said first maximum I/O rate, wherein said I/O statistic is an I/O rate; or comparing said I/O statistic to said first maximum throughput rate, wherein said I/O statistic is an I/O throughput.

10. The one or more non-transitory computer-readable media of claim 2, wherein issuing said request to said storage system when said request is dequeued from said particular I/O request queue based on said first I/O policy comprises:

determining the first maximum I/O rate is not exceeded for the first I/O scheduling group; and in response to determining the first maximum I/O rate is not exceeded for the first I/O scheduling group, dequeuing the request from the particular I/O request queue.

11. The one or more non-transitory computer-readable media of claim 2, wherein the instructions further comprise instructions which, when executed by one or more hardware processors, cause: if determined not to place said request in an I/O request queue, then immediately issuing said request to said storage system.

12. The one or more non-transitory computer-readable media of claim 2, wherein said request is issued to said storage system from a database server.

13. The one or more non-transitory computer-readable media of claim 2, wherein:
the first I/O allocation is a particular percentage of the total resources, of said storage system, available to satisfy I/O requests from the plurality of I/O scheduling groups; and
the instructions further comprise instructions which, when executed by one or more hardware processors, cause determining the first maximum I/O rate by determining a quantity of resources that is represented by the particular percentage of the total resources.

14. The one or more non-transitory computer-readable media of claim 2, wherein:
I/O requests associated with the first I/O scheduling group are received by a first database server; and
I/O requests associated with the second I/O scheduling group are received by a second database server.

15. A method comprising:
assigning a first initial I/O (input/output) allocation to a first database server that manages data persistently stored on a shared storage system;
assigning a second initial I/O allocation to a second database server that manages data persistently stored on the shared storage system;
while the second database server continues to operate and make use of a first portion of the second initial I/O allocation to access data persistently stored on the shared storage system:
the second database server determining that the second database server does not require a second portion of the second initial I/O allocation,
wherein the second portion of the second initial I/O allocation is less than the second initial I/O allocation;
in response to determining that the second database server does not require the second portion of the second initial I/O allocation, the second database server sending, to the first database server, one or more messages donating to the first database server the second portion of the second initial I/O allocation; and
in response to receiving the one or more messages, the first database server issuing I/O requests, to the shared storage system, at a rate that exceeds the first initial I/O allocation, allocated to the first database server, of resources for the shared storage system;
wherein the method is performed by one or more computing devices.

16. A computer-executed method for managing shared storage input-output (I/O) resources, comprising:
receiving a request for an I/O operation on a storage system to which a plurality of requests for I/O operations have been recently issued;
wherein the plurality of requests includes a first set of requests that are associated with a first I/O scheduling group of a plurality of I/O scheduling groups, and a second set of requests that are associated with a second I/O scheduling group of the plurality of I/O scheduling groups;
determining which I/O scheduling group of the plurality of I/O scheduling groups the received request is associated with;
in response to determining that the received request is associated with the first I/O scheduling group:
identifying an I/O policy associated with the first I/O scheduling group;
wherein the I/O policy specifies a maximum threshold, wherein the maximum threshold is one of:
a maximum I/O rate at which I/O operations should issue to said storage system for requests associated with said first I/O scheduling group, or
a maximum throughput rate at which I/O operations should issue to said storage system for requests associated with said first I/O scheduling group;
determining an I/O statistic associated with I/O operations that have recently issued to said storage system for said first I/O scheduling group;
wherein the I/O statistic is one of: I/O rate and I/O throughput;
determining, based at least in part on said I/O statistic, whether the maximum threshold specified in said I/O policy would be exceeded if the request is not placed in an I/O request queue;
in response to determining that the maximum threshold specified in said I/O policy would be exceeded if the request is not placed in the I/O request queue:
placing said request in a particular I/O request queue associated with said first I/O scheduling group; and
issuing said request to said storage system when said request is dequeued from said particular I/O request queue based on said I/O policy, for performance of said I/O operation by said storage system;
wherein the method is performed by one or more computing devices.

17. The computer-executed method of claim 16, wherein:
the I/O statistic is an I/O rate;
the maximum threshold is the maximum I/O rate; and
determining, based at least in part on said I/O statistic, whether the maximum threshold specified in said I/O policy would be exceeded if the request is not placed in an I/O request queue further comprises:
determining whether an I/O rate, at which I/O operations have recently issued to said storage system for said first I/O scheduling group, exceeds the maximum I/O rate, and
determining that the maximum threshold specified in said I/O policy would be exceeded if the request is not placed in an I/O request queue based, at least in part, on determining that the I/O rate exceeds the maximum I/O rate.

18. The method of claim 16, wherein:
said I/O statistic is an I/O throughput;
the maximum threshold is the maximum throughput rate; and
determining, based at least in part on said I/O statistic, whether the maximum threshold specified in said I/O policy would be exceeded if the request is not placed in an I/O request queue further comprises:

determining whether the I/O throughput, at which I/O operations have recently issued to said storage system for said first I/O scheduling group, exceeds the maximum throughput rate, and determining that the maximum threshold specified in said I/O policy would be exceeded if the request is not placed in an I/O request queue based, at least in part, on determining that the I/O throughput exceeds the maximum throughput rate.

19. The method of claim 18, wherein:

said maximum threshold is a first maximum threshold;

said I/O policy includes a plurality of I/O sub-policies that specify second maximum thresholds for I/O operations issuing to said storage system based on requests associated with one or more corresponding I/O scheduling groups;

the one or more corresponding I/O scheduling groups includes the first I/O scheduling group; and determining whether to place said request in an I/O request queue comprises comparing said I/O statistic to a particular second maximum threshold that corresponds to a particular I/O sub-policy of the plurality of I/O sub-policies included in the I/O policy with which said first I/O scheduling group is associated.

20. The method of claim 16, wherein:

the I/O policy associated with the first I/O scheduling group is a first I/O policy;

the plurality of I/O scheduling groups includes one or more other I/O scheduling groups other than the first I/O scheduling group;

each of the one or more other I/O scheduling groups is associated with an I/O policy; and determining that the maximum threshold specified in said first I/O policy would be exceeded if the request is not placed in the I/O request queue comprises determining that the maximum threshold specified in said first I/O policy would be exceeded if the request is not placed in the I/O request queue during a period of time in which each of the one or more other I/O scheduling groups is in compliance with the I/O policy associated with the I/O scheduling group.

21. One or more non-transitory computer-readable media storing one or more sequences of instructions which, when executed by one or more hardware processors, cause:

assigning a first initial I/O (input/output) allocation to a first database server that manages data persistently stored on a shared storage system;

assigning a second initial I/O allocation to a second database server that manages data persistently stored on the shared storage system;

while the second database server continues to operate and make use of a first portion of the second initial I/O allocation to access data persistently stored on the shared storage system:

the second database server determining that the second database server does not require a second portion of the second initial I/O allocation;

wherein the second portion of the second initial I/O allocation is less than the second initial I/O allocation;

in response to determining that the second database server does not require the second portion of the second initial I/O allocation, the second database server sending, to the first database server, one or more messages donating to the first database server the second portion of the second initial I/O allocation; and in response to receiving the one or more messages, the first database server issuing I/O requests, to the shared storage system, at a rate that exceeds the first initial I/O allocation, allocated to the first database server, of resources for the shared storage system.

22. One or more non-transitory computer-readable media storing one or more sequences of instructions which, when executed by one or more hardware processors, cause managing shared storage input-output (I/O) resources, wherein managing the shared storage input-output (I/O) resources comprises:

receiving a request for an I/O operation on a storage system to which a plurality of requests for I/O operations have been recently issued;

wherein the plurality of requests includes a first set of requests that are associated with a first I/O scheduling group of a plurality of I/O scheduling groups, and a second set of requests that are associated with a second I/O scheduling group of the plurality of I/O scheduling groups;

determining which I/O scheduling group of the plurality of I/O scheduling groups the received request is associated with;

in response to determining that the received request is associated with the first I/O scheduling group:

identifying an I/O policy associated with the first I/O scheduling group;

wherein the I/O policy specifies a maximum threshold, wherein the maximum threshold is one of:

a maximum I/O rate at which I/O operations should issue to said storage system for requests associated with said first I/O scheduling group, or a maximum throughput rate at which I/O operations should issue to said storage system for requests associated with said first I/O scheduling group;

determining an I/O statistic associated with I/O operations that have recently issued to said storage system for said first I/O scheduling group;

wherein the I/O statistic is one of: I/O rate and I/O throughput;

determining, based at least in part on said I/O statistic, whether the maximum threshold specified in said I/O policy would be exceeded if the request is not placed in an I/O request queue; and in response to determining that the maximum threshold specified in said I/O policy would be exceeded if the request is not placed in the I/O request queue:

placing said request in a particular I/O request queue associated with said first I/O scheduling group; and issuing said request to said storage system when said request is dequeued from said particular I/O request queue based on said I/O policy, for performance of said I/O operation by said storage system.

23. The one or more computer-readable media of claim 22, wherein:

the I/O statistic is an I/O rate;

the maximum threshold is the maximum I/O rate; and determining, based at least in part on said I/O statistic, whether the maximum threshold specified in said I/O policy would be exceeded if the request is not placed in an I/O request queue further comprises:

determining whether an I/O rate, at which I/O operations have recently issued to said storage system for said first I/O scheduling group, exceeds the maximum I/O rate, and determining that the maximum threshold specified in said I/O policy would be exceeded if the request is not placed in an I/O request queue based, at least in part, on determining that the I/O rate exceeds the maximum I/O rate.

24. The one or more computer-readable media of claim 22, wherein:
said I/O statistic is an I/O throughput;
the maximum threshold is the maximum throughput rate; and
determining, based at least in part on said I/O statistic, whether the maximum threshold specified in said I/O policy would be exceeded if the request is not placed in an I/O request queue further comprises:
  determining whether the I/O throughput, at which I/O operations have recently issued to said storage system for said first I/O scheduling group, exceeds the maximum throughput rate, and
  determining that the maximum threshold specified in said I/O policy would be exceeded if the request is not placed in an I/O request queue based, at least in part, on determining that the I/O throughput exceeds the maximum throughput rate.

25. The one or more computer-readable media of claim 24, wherein:
said maximum threshold is a first maximum threshold;
said I/O policy includes a plurality of I/O sub-policies that specify second maximum thresholds for I/O operations issuing to said storage system based on requests associated with one or more corresponding I/O scheduling groups;
the one or more corresponding I/O scheduling groups includes the first I/O scheduling group; and
determining whether to place said request in an I/O request queue comprises comparing said I/O statistic to a particular second maximum threshold that corresponds to a particular I/O sub-policy of the plurality of I/O sub-policies included in the I/O policy with which said first I/O scheduling group is associated.

26. The one or more computer-readable media of claim 22, wherein:
the I/O policy associated with the first I/O scheduling group is a first I/O policy;
the plurality of I/O scheduling groups includes one or more other I/O scheduling groups other than the first I/O scheduling group;
each of the one or more other I/O scheduling groups is associated with an I/O policy; and
determining that the maximum threshold specified in said first I/O policy would be exceeded if the request is not placed in the I/O request queue comprises determining that the maximum threshold specified in said first I/O policy would be exceeded if the request is not placed in the I/O request queue during a period of time in which each of the one or more other I/O scheduling groups is in compliance with the I/O policy associated with the I/O scheduling group.

* * * * *

UNITED STATES PATENT AND TRADEMARK OFFICE
CERTIFICATE OF CORRECTION

PATENT NO. : 9,436,389 B2
APPLICATION NO. : 14/529436
DATED : September 6, 2016
INVENTOR(S) : Lee et al.

Page 1 of 1

It is certified that error appears in the above-identified patent and that said Letters Patent is hereby corrected as shown below:

In the Specification

In Column 7, Line 9, delete ""TOPS"" and insert -- "IOPS" --, therefor.

In the Claims

In Column 19, Line 47, in Claim 15, delete "allocation," and insert -- allocation; --, therefor.

Signed and Sealed this
Twenty-fifth Day of April, 2017

Michelle K. Lee
*Director of the United States Patent and Trademark Office*